United States Patent
Domenica et al.

(10) Patent No.: US 9,892,389 B2
(45) Date of Patent: Feb. 13, 2018

(54) METHOD, SYSTEM, AND COMPUTER PROGRAM PRODUCT FOR CUSTOMER-LEVEL DATA VERIFICATION

(71) Applicant: III HOLDINGS 1, LLC, Wilmington, DE (US)

(72) Inventors: Danielle R. Domenica, Phoenix, AZ (US); Rahul S. Siddharth, New Delhi (IN); Chanderpreet Duggal, Phoenix, AZ (US); Pradeep V. Ramesh, Haryana (IN); Janet L. Biffle, Cave Creek, AZ (US); Kristin Hoyne Gomes, State College, PA (US)

(73) Assignee: III Holdings I, LLC, Wilmington, DE (US)

( * ) Notice: Subject to any disclaimer, the term of this patent is extended or adjusted under 35 U.S.C. 154(b) by 0 days.

(21) Appl. No.: 14/949,076

(22) Filed: Nov. 23, 2015

(65) Prior Publication Data
US 2016/0148176 A1 May 26, 2016

Related U.S. Application Data

(63) Continuation of application No. 11/448,767, filed on Jun. 8, 2006, now Pat. No. 9,195,985.

(51) Int. Cl.
*G06Q 40/00* (2012.01)
*G06Q 20/10* (2012.01)
*G06Q 20/40* (2012.01)

(52) U.S. Cl.
CPC ........... *G06Q 20/102* (2013.01); *G06Q 20/40* (2013.01); *G06Q 20/401* (2013.01); *G06Q 20/4016* (2013.01)

(58) Field of Classification Search
USPC ...................................................... 235/379
See application file for complete search history.

(56) References Cited

U.S. PATENT DOCUMENTS

| | | | |
|---|---|---|---|
| 4,864,557 A | 9/1989 | Morton et al. | |
| 5,602,933 A | 2/1997 | Blackwell et al. | |

(Continued)

FOREIGN PATENT DOCUMENTS

| | | |
|---|---|---|
| WO | 01/13576 | 2/2001 |
| WO | 02099720 | 12/2002 |

OTHER PUBLICATIONS

Information Technology Newsweekly, "Convergys Information Management Group, Inc.; Patent Issued for System and Method for a Flexible Device-Based Rating Engine," Jul. 23, 2013, 4 pages.

(Continued)

*Primary Examiner* — Rafferty Kelly
(74) *Attorney, Agent, or Firm* — Meyertons, Hood, Kivlin, Kowert & Goetzel, P.C.

(57) ABSTRACT

A system, method, and computer program to reduce incorrectly declined transactions and improve risk calculation accuracy by reducing error probability during fraud detection. The tool first receives at least one data element as well as transaction account data and/or financial transaction instrument data. Then a customer is determined from a first record associated with the transaction account data and/or financial transaction instrument data. A record search is performed to identify at least one additional record associated with the customer. Finally, the data element is compared to the information contained in the additional record to create a comparison result that verifies a customer address. The comparison result may be used as an input to transaction risk calculations. The comparison result may also be provided to a merchant system and/or merchant for use in a decision-making process, for example, to verify customer identity.

16 Claims, 11 Drawing Sheets

(56) References Cited

U.S. PATENT DOCUMENTS

| | | |
|---|---|---|
| 5,648,647 A | 7/1997 | Seiler |
| 5,696,952 A | 12/1997 | Pontarelli |
| 5,768,602 A | 6/1998 | Dhuey |
| 5,812,668 A | 9/1998 | Weber |
| 5,832,283 A | 11/1998 | Chou et al. |
| 5,850,446 A | 12/1998 | Berger et al. |
| 5,913,202 A | 6/1999 | Motoyama |
| 5,949,045 A | 9/1999 | Ezawa et al. |
| 5,996,076 A | 11/1999 | Rowney et al. |
| 6,023,679 A | 2/2000 | Acebo et al. |
| 6,029,154 A | 2/2000 | Pettitt |
| 6,160,874 A | 12/2000 | Dickerman et al. |
| 6,223,289 B1 | 4/2001 | Wall et al. |
| 6,256,019 B1 | 7/2001 | Allport |
| 6,347,339 B1 | 2/2002 | Morris et al. |
| 6,349,335 B1 | 2/2002 | Jenney |
| 6,374,145 B1 | 4/2002 | Lignoul |
| 6,463,474 B1 | 10/2002 | Fuh et al. |
| 6,484,174 B1 | 11/2002 | Wall et al. |
| 6,490,624 B1 | 12/2002 | Sampson et al. |
| 6,560,322 B2 | 5/2003 | Yamaguchi et al. |
| 6,560,711 B1 | 5/2003 | Given et al. |
| 6,609,154 B1 | 8/2003 | Fuh et al. |
| 6,615,244 B1 | 9/2003 | Singhal |
| 6,631,405 B1 | 10/2003 | Kobata |
| 6,658,393 B1 | 12/2003 | Basch et al. |
| 6,732,919 B2 | 5/2004 | Macklin et al. |
| 6,926,203 B1 | 8/2005 | Sehr |
| 6,999,943 B1 | 2/2006 | Johnson et al. |
| 7,024,556 B1 | 4/2006 | Hadjinikitas et al. |
| 7,051,002 B2 | 5/2006 | Keresman, III et al. |
| 7,100,203 B1 | 8/2006 | Tosey |
| 7,136,835 B1 | 11/2006 | Flitcroft et al. |
| 7,331,518 B2 | 2/2008 | Rable |
| 7,337,210 B2 | 2/2008 | Barsness |
| 7,640,185 B1 | 12/2009 | Giordano et al. |
| 7,660,756 B2 | 2/2010 | Nakamura et al. |
| 7,904,332 B1 | 3/2011 | Merkley, Jr. et al. |
| 8,214,292 B2 | 7/2012 | Duggal et al. |
| 2002/0035548 A1 | 3/2002 | Hogan et al. |
| 2002/0052852 A1 | 5/2002 | Bozeman |
| 2002/0091554 A1 | 7/2002 | Burrows |
| 2002/0138418 A1 | 9/2002 | Zarin et al. |
| 2002/0165954 A1 | 11/2002 | Eshghi et al. |
| 2002/0174065 A1 | 11/2002 | Coward |
| 2002/0174335 A1 | 11/2002 | Zhang et al. |
| 2002/0188573 A1 | 12/2002 | Calhoon |
| 2003/0061157 A1 | 3/2003 | Hirka et al. |
| 2003/0069820 A1 | 4/2003 | Hillmer et al. |
| 2003/0105707 A1 | 6/2003 | Audebert et al. |
| 2003/0120615 A1 | 6/2003 | Kuo |
| 2003/0167226 A1 | 9/2003 | Britton et al. |
| 2003/0174823 A1 | 9/2003 | Justice et al. |
| 2003/0195963 A1 | 10/2003 | Song et al. |
| 2003/0225687 A1 | 12/2003 | Lawrence |
| 2004/0059930 A1 | 3/2004 | DiFalco et al. |
| 2004/0167854 A1 | 8/2004 | Knowles et al. |
| 2004/0232225 A1 | 11/2004 | Bishop et al. |
| 2005/0108178 A1 | 5/2005 | York |
| 2005/0133587 A1 | 6/2005 | Michelassi et al. |
| 2005/0240522 A1 | 10/2005 | Kranzley et al. |
| 2006/0026076 A1 | 2/2006 | Raymond |
| 2006/0026689 A1 | 2/2006 | Barker et al. |
| 2006/0106738 A1* | 5/2006 | Schleicher ........ G07B 17/00435 705/401 |
| 2006/0212387 A1 | 9/2006 | Jensen |
| 2006/0247991 A1 | 11/2006 | Jin et al. |
| 2007/0192249 A1 | 8/2007 | Biffle et al. |
| 2007/0215698 A1 | 9/2007 | Perry |
| 2007/0282674 A1 | 12/2007 | Gomes et al. |
| 2007/0284433 A1 | 12/2007 | Domenica et al. |
| 2008/0275821 A1 | 11/2008 | Bishop et al. |
| 2008/0314977 A1 | 12/2008 | Domenica et al. |
| 2009/0313134 A1 | 12/2009 | Faith et al. |
| 2010/0100484 A1 | 4/2010 | Nguyen et al. |
| 2010/0257068 A1 | 10/2010 | Duggal et al. |

OTHER PUBLICATIONS

Video Technology News, "Common Interface Conditional Access System Wins Crucial Support in Europe," Jun. 5, 1995, 2 pages.

Anonymous, Card Processing and management, Credit Management, Oct. 1998; ABI/INFORM Global, p. 23.

Nancy Paradis, Mail order company returns money Series: Action; Recalls; [SOUTH PI NELLAS Edition], St. Petersburg Times, Jun. 11, 2001, p. 2.D.

Peter Lucas, "New combatants in the e-check wars: tired of watching the explosion in electronic check volume getting routed through the ACH, Visa and EFT networks have plunged into e-check processing (E-Payments)," Credit Card Management, v. 15, n. 12, Feb. 2003, p. 24(3).

International Preliminary Report on Patentability in Application No. PCT/US2005/004135 dated Sep. 25, 2006, 3 pages.

International Search Report and Written Opinion in Application No. PCT/US2005/004135 dated Feb. 28, 2006, 4 pages.

Office Action in U.S. Appl. No. 11/448,767 dated Apr. 11, 2007, 10 pages.

Office Action in U.S. Appl. No. 11/448,767 dated Nov. 13, 2007, 7 pages.

Office Action in U.S. Appl. No. 11/448,767 dated May 29, 2008, 8 pages.

Office Action in U.S. Appl. No. 11/448,767 dated Oct. 20, 2008, 7 pages.

Office Action in U.S. Appl. No. 11/448,767 dated Mar. 25, 2009, 8 pages.

Office Action in U.S. Appl. No. 11/448,767 dated Nov. 4, 2009, 7 pages.

Office Action in U.S. Appl. No. 11/448,767 dated Apr. 8, 2010, 8 pages.

Office Action in U.S. Appl. No. 11/448,767 dated Aug. 16, 2010, 6 pages.

Office Action in U.S. Appl. No. 11/448,767 dated Jan. 10, 2011, 7 pages.

Office Action in U.S. Appl. No. 11/448,767 dated Aug. 20, 2013, 7 pages.

Office Action in U.S. Appl. No. 11/448,767 dated May 6, 2014, 8 pages.

Office Action in U.S. Appl. No. 12/205,412 dated Aug. 10, 2010, 6 pages.

Office Action in U.S. Appl. No. 12/205,412 dated Jan. 24, 2011, 7 pages.

Office Action in U.S. Appl. No. 12/205,412 dated May 2, 2014, 7 pages.

* cited by examiner

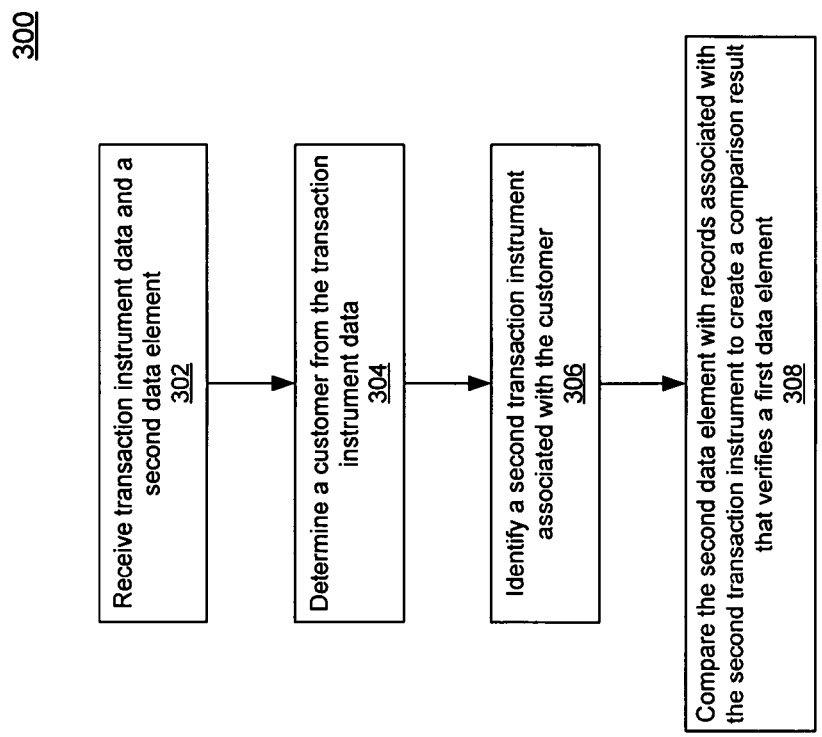

Card presented transaction

METHOD, SYSTEM, AND COMPUTER PROGRAM PRODUCT FOR CUSTOMER-LEVEL DATA VERIFICATION

RELATED APPLICATIONS

The present application is a continuation of U.S. application Ser. No. 11/448,767 filed Jun. 8, 2006 (now U.S. Pat. No. 9,195,985); the disclosure of which is incorporated by reference herein in its entirety.

BACKGROUND OF THE INVENTION

Field of the Invention

The present invention generally relates to fraud detection and more particularly to reducing transaction errors.

Background Art

Many customers have multiple financial transaction instruments and transaction accounts with a financial institution. These customers often have different billing addresses, mailing addresses, names, telephone numbers, and/or e-mail addresses associated with their different financial transaction instruments and transaction accounts. Thus, when a customer provides a billing address, a mailing address, a name, a telephone number, or an e-mail address to a merchant, the customer may accidentally provide information that is valid, but not identical to that on record for a specific financial transaction instrument or transaction account. When the merchant provides this information to an address verification system, the address verification system responds that the information provided does not match, or only partially matches, that on record. This may result in an incorrect calculation of transaction risk, an incorrectly declined transaction, or an authorization error as well as a reduction in customer satisfaction. This problem has aggravated negative effects because it is likely to occur to devoted customers having multiple transaction accounts and/or financial transaction instruments.

FIG. 1A illustrates an example of the problem where a customer has a first transaction account 102 and a second transaction account 104 with identical names associated with the accounts, but different addresses. Both account records contain information including an account number 106A,B; a name 108A,B; an address 110A,B; and a postal code 112A,B.

The problem arises when a customer presents data 114 to a merchant. In the example of FIG. 1A, presented data 114 includes a financial transaction instrument or an account number 116 similar to that of the first transaction account 102, a presented address 118 similar to that of the second transaction account 104, a presented postal code 120 similar to that of the second transaction account 104, and a presented name 122 similar to that of both transaction accounts 102, 104. The merchant communicates presented data 114 to an address verification system. The address verification system compares presented data 114 to first transaction account 102 based on the similarity between presented account number 116 and first transaction account's account number 106A. The address verification system compares presented address 118 and presented postal code 120 to address 110A and postal code 112A of the first transaction account 102. The address verification system erroneously responds that presented address 118 and presented postal code 120 do not match that of the customer. This error may result in an incorrect calculation of transaction risk, an incorrectly declined transaction, or an authorization error.

FIG. 1B illustrates another example of the problem where a customer has two transaction accounts with identical addresses, a maiden name on a first transaction account 151, and a married name on a second transaction account 152. In this example, both accounts contain information including an account number 156A,B; a name 158A,B; an address 160A,B; and a postal code 162A,B.

The problem arises when a customer presents data 164 to a merchant. In the example of FIG. 1B, presented data 164 includes a financial transaction instrument or an account number 163 similar to that of first transaction account 151, a presented address 166, a presented postal code 168, and a presented name 170 similar to that of the second financial transaction account 152. The merchant communicates the presented data to an address verification system. The address verification system compares presented data 164 to first transaction account 151 based on the similarity of presented account number 163 and the first transaction account's 151 account number 156A. The address verification system compares the presented address 166 to first transaction account's 151 address 160A and responds there is a match. The address verification system also compares presented postal code 168 to first transaction account's 151 postal code 162A and correctly responds that there is a match. However, when the address verification system compares presented name 170 to the first transaction account's 151 name 158A, the address verification system erroneously responds that the name provided does not match that of the customer. Thus, the address verification system erroneously provides a partial match result. This may result in an incorrect calculation of transaction risk, an incorrectly declined transaction, or an authorization error.

Thus, given the foregoing, what is needed is a system, method, and computer program product for customer-level data verification that overcomes the shortcomings listed above.

BRIEF SUMMARY OF THE INVENTION

The customer-level data verification tool meets the above-identified needs by providing a system, method, and computer program product that verifies data elements across multiple records for an individual customer. An advantage of the customer-level data verification tool is that it improves accuracy of transaction risk calculations by reducing a probability of errors during a fraud detection process. This provides a reduction in the number of incorrectly declined transactions due to authorization errors as well as providing an increase in customer satisfaction. Another advantage of the customer-level data verification tool is that it provides a merchant system and/or merchant with comparison results at the data element level so the merchant system and/or merchant has comparison results available as input to a decision-making process.

The customer-level data verification tool first receives at least one data element as well as transaction account data and/or financial transaction instrument data. Then, a customer is determined from a first record associated with the transaction account data and/or financial transaction instrument data. The customer may be identified in the form of a customer number. A record search is performed to identify at least one additional record associated with the customer. The record search may be based on a search for a common customer number. Finally, the data element is compared to information contained in an additional record to create a comparison result that verifies a customer address. The comparison result may be used as an input to transaction risk calculations. The comparison result may also be provided to a merchant system and/or merchant for use in a decision-making process, for example, to verify customer identity.

Further embodiments, features, and advantages of the customer-level data verification tool, as well as the structure and operation of the various embodiments of the customer-level data verification tool, are described in detail below with reference to the accompanying drawings.

BRIEF DESCRIPTION OF THE DRAWINGS/FIGURES

The accompanying drawings, which are incorporated herein and form a part of the specification, illustrate the invention and, together with the description, further serve to explain the principles of the invention and to enable a person skilled in the pertinent art to make and use the invention:

FIG. 3 is a flowchart of an exemplary process for customer-level data verification;

The invention will be described with reference to the accompanying drawings. The drawing in which an element first appears is typically indicated by the leftmost digit(s) in the corresponding reference number.

DETAILED DESCRIPTION OF THE INVENTION

I. Overview

Figure 1A:
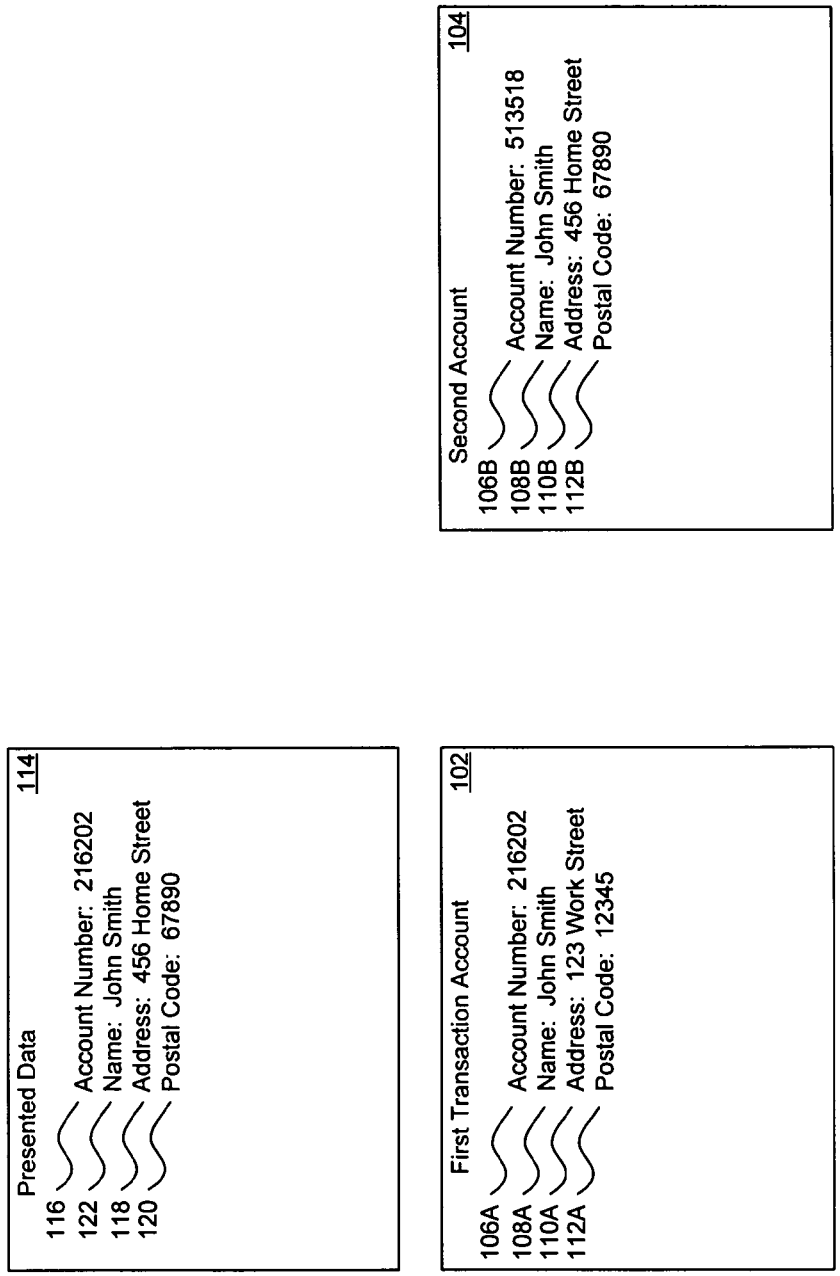
FIG. 1A illustrates an example of the problem that occurs when one customer has two accounts with an identical name and different addresses.
Figure 1B:
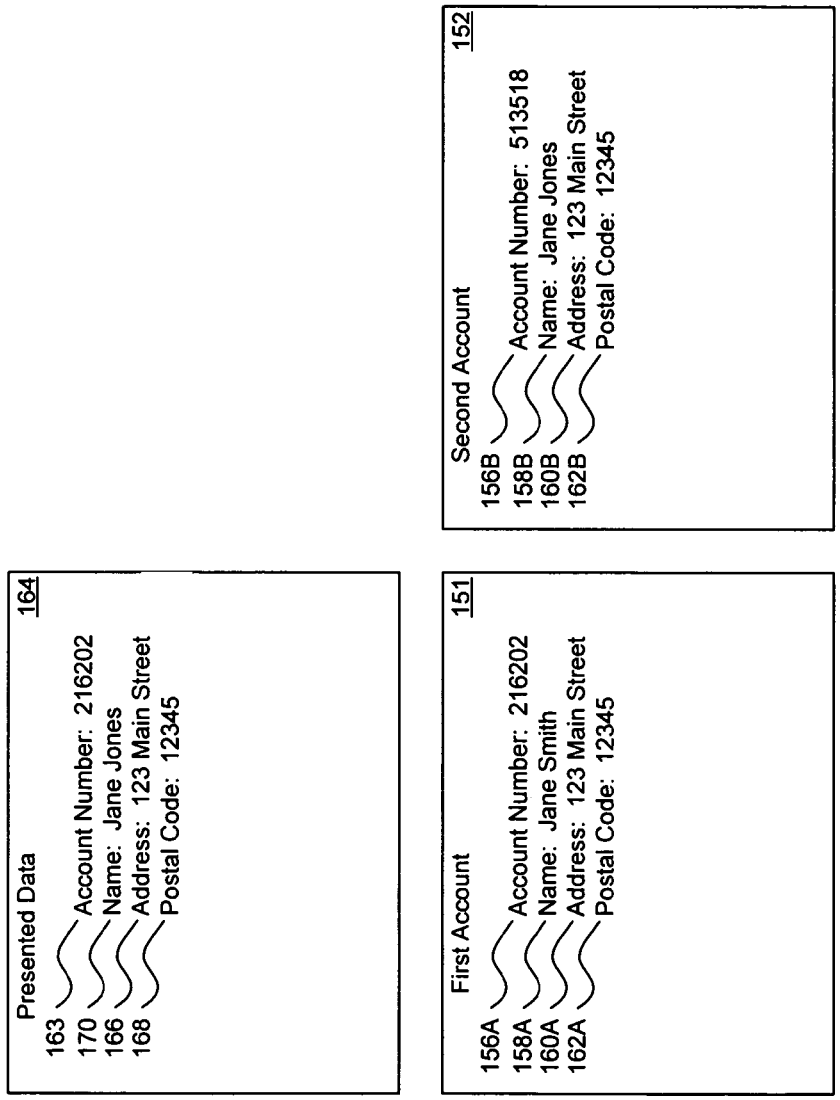
FIG. 1B illustrates an example of the problem that occurs when one customer has two accounts with an identical address and different names.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications. It will also be apparent to a person skilled in the pertinent art that this invention may be implemented in a variety of geographic regions including, and not limited to, national, continental, international, and world-wide regions.

The terms "user," "end user," "consumer," "customer," "participant," and/or the plural form of these terms are used interchangeably throughout herein to refer to those persons or entities capable of accessing, using, being affected by and/or benefiting from the tool that the present invention provides for customer-level data verification. Furthermore, the terms "business" or "merchant" may be used interchangeably with each other and shall mean any person, entity, distributor system, software and/or hardware that is a provider, broker, and/or any other entity in the distribution chain of goods or services. For example, a merchant may be a grocery store, a retail store, a travel agency, a service provider, an on-line merchant, or the like.

1. Transaction Accounts and Instrument

A "transaction account" as used herein refers to an account associated with an open account/card system or a closed account/card system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial transaction instrument. A customer may have multiple transaction accounts.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader. A customer may have multiple financial transaction instruments.

2. Open Versus Closed Cards

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

3. Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

4. Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit, for example, a merchant system 204, implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

5. Account and Merchant Numbers

An "account," "account number," or "account code," as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), radio frequency identification (RFID), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$$N_1N_2N_3N_4 \ N_5N_6N_7N_8 \ N_9N_{10}N_{11}N_{12} \ N_{13}N_{14}N_{15}N_{16}$$

The first five to seven digits are reserved for processing purposes and identify the issuing institution, card type, etc. In this example, the last (sixteenth) digit is typically used as a sum check for the sixteen-digit number. The intermediary eight-to-ten digits are used to uniquely identify the customer, card holder or cardmember.

A merchant account number may be, for example, any number and/or alphanumeric characters that identifies a particular merchant for purposes of card acceptance, account reconciliation, reporting and the like.

6. RFID and Transmission of Magnetic Stripe Data

It should be noted that the transfer of information in accordance with the present invention, may be done in a format recognizable by a merchant system or account issuer. In that regard, by way of example, the information may be transmitted from an RFID device to an RFID reader, or from the RFID reader to the merchant system in magnetic stripe or multi-track magnetic stripe format.

Because of the proliferation of devices using magnetic stripe format, the standards for coding information in magnetic stripe format were standardized by the International Organization for Standardization in ISO/IEC 7811-n (characteristics for identification cards) which are incorporated herein by reference. The ISO/IEC 7811 standards specify the conditions for conformance, physical characteristics for the card (warpage and surface distortions) and the magnetic stripe area (location, height and surface profile, roughness, adhesion, wear and resistance to chemicals), the signal amplitude performance characteristics of the magnetic stripe, the encoding specification including technique (MFM), angle of recording, bit density, flux transition spacing variation and signal amplitude, the data structure including track format, use of error correction techniques, user data capacity for ID-1, ID-2 and ID-3 size cards, and decoding techniques, and the location of encoded tracks.

Typically, magnetic stripe information is formatted in three tracks. Certain industry information must be maintained on certain portions of the tracks, while other portions of the tracks may have open data fields. The contents of each track and the formatting of the information provided to each track is controlled by the ISO/IEC 7811 standard. For example, the information must typically be encoded in binary. Track 1 is usually encoded with user information (i.e., name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with the present invention, it may be provided in magnetic stripe track format. For example, the counter values, authentication tags and encrypted identifiers, described herein, may be forwarded encoded in all or a portion of a data stream representing data encoded in, for example, track 2 or track 3 format.

Persons skilled in the relevant arts will understand the breadth of the terms used herein and that the exemplary descriptions provided are not intended to be limiting of the generally understood meanings attributed to the foregoing terms.

It is noted that references in the specification to "one embodiment," "an embodiment," "an example embodiment," etc., indicate that the embodiment described may include a particular feature, structure, and/or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

II. System

Figure 2:
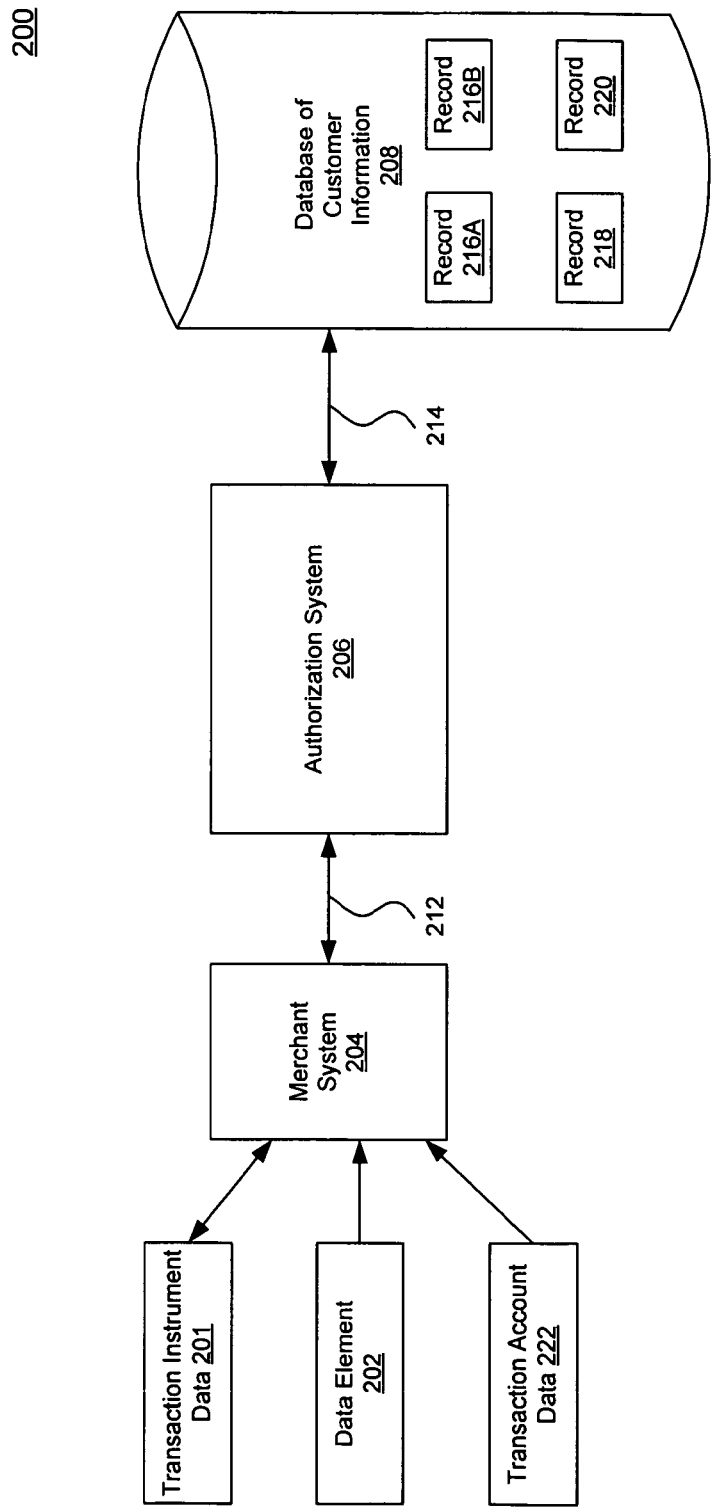
FIG. 2 is a block diagram of an exemplary system for customer-level data verification.

FIG. 2 is a block diagram of an exemplary system 200 for data element verification. The system includes merchant system 204 which, among other functions, gathers customer information. Customer information includes, for example, and not limited to, transaction instrument data 201, transaction account data 222, and/or a data element 202.

Transaction instrument data 201 is data that identifies a financial transaction instrument. Transaction instrument data 201 includes information that is stored in, on, or by any financial transaction instrument. Examples of transaction instrument data 201 include, and are not limited to, radio frequency identification (RFID) data, magnetic stripe data, an account number, account data, account name, a credit card verification number, and an expiration date.

Data element 202 is information known by both a financial transaction instrument issuer and the customer having a financial transaction instrument issued by the financial transaction instrument issuer. Data element 202 is used for identity verification and/or as a fraud prevention tool. Examples of data element 202 include, and are not limited to, a name, a phone number, an address, a postal code, an e-mail address, an IP address, a complete social security number, a partial social security number, an account number, a customer code, a personal identification number, and a customer-specific alphanumeric identifier. Data element 202 is often provided to a merchant during the normal course of a transaction, thus collection of data elements for data verification imposes little, if any, burden on the customer. Although systems and methods will be described herein with reference to address verification, one of skill in the related art(s) will recognize that other data verifications can be made without departing from the spirit and scope of the present invention.

Merchant system 204 is a system for, among other functions, collecting transaction instrument data 201 and/or data element 202 for transaction processing. In an embodiment, a merchant system includes, and is not limited to, a telephone network, an intranet, a global public Internet, a point of interaction device (e.g., a point of sale (POS) device, a personal digital assistant (PDA), a mobile telephone, a kiosk, etc.), an online communications device, an off-line communications device, a wireless communications device, and/or the like. Transaction processing includes, and is not limited to, identity verification, data verification, and authorization of use of a financial transaction instrument.

Merchant system 204 is coupled via a communication link 212 to an authorization system 206. Examples of communication link 212 include, and are not limited to, a telephone network, a cable, a radio frequency transmission system, a cellular telephone, and/or a computer network.

Authorization system 206 is a system that provides, among other functions, an authorization decision based on risk analysis in response to an authorization request. In an embodiment, authorization system 206 provides a data verification reply in response to a data verification request. In an embodiment, authorization system 206 includes merchant system 204. In another embodiment, merchant system 204 includes authorization system 206.

Authorization system 206 is coupled via a communication link 214 to a database of customer information 208. Examples of communication link 214 include, and are not limited to, a telephone network, a cable, a radio frequency transmission system, a cellular telephone, and/or a computer network.

Database of customer information 208 stores customer records 216A,B; 218; and 220. Information contained in the records may be in any format and may contain alphanumeric characters. Database of customer information 208 may be part of authorization system 206. In an embodiment, customer records 216A, 216B, 218, and 220 are stored on the basis of individual financial transaction instruments. One record is kept for each individual financial transaction instrument. For example, a customer having a first financial transaction instrument and a second financial transaction instrument would have two records in database of customer information 208. In an example, first record 216A is associated with the first financial transaction instrument and second record 216B is associated with the second financial transaction instrument. Multiple records may be kept for each individual financial transaction instrument.

In another embodiment, customer records 216A, 216B, 218, and 220 are stored on the basis of customers. One record is stored per customer with all of the customer's financial transaction instruments recorded on the same record. For example, a first customer having a first plurality of financial transaction instruments is associated with first record 218 while a second customer having a second plurality of financial transaction instruments is associated with second record 220.

III. Process

FIG. 3 is a flowchart of an exemplary process 300 for data element verification. In step 302, transaction instrument data and a data element is received. The transaction instrument data and a data element may be received by a system or computer product that performs data verification. In an example, in step 302, transaction instrument data 201 and/or data element 202 are received by authorization system 206 from merchant system 204 via communication link 212. In another embodiment, in step 302, transaction instrument data 201 and/or data element 202 are received by merchant system 204. In another example, transaction instrument data 201 and/or data element 202 are received at least in part from one of a point-of-sale device, a sales platform, a computer, or a website. In an embodiment, the exemplary process of FIG. 3 is performed by the system illustrated in FIG. 7.

In one example of step 302, data element 202 is, or represents, at least one of a name, a phone number, an address, a postal code, an e-mail address, an IP address, a complete social security number, a partial social security number, an account number, a customer code, a personal identification number, and/or a customer-specific alphanumeric identifier. In an example, data element 202 may include a billing address or a shipping address.

In another embodiment, step 302 is commenced in response to reception of a stand-alone verification request. A stand-alone verification request may be a request made by merchant system 204 that does not simultaneously contain an authorization request. A stand-alone verification request may be made by merchant system 204 to verify an address and/or data element 202 provided by a customer. For example, a stand-alone verification request may be made to verify a shipping address, a mailing address, a billing address, a customer address, and/or data element 202.

In step 304, a customer is determined from transaction instrument data 201. In an example, step 304 is performed by authorization system 206. The customer may be identified by authorization system 206 through a search for at least one customer record in database of customer information 208. In step 304, the transaction instrument data may include an account number and/or a customer number. In an embodiment, step 304 is performed by merchant system 204.

In step 306, a second transaction instrument associated with the customer is identified. In an example, step 306 is performed by authorization system 206. The customer may be identified by a customer number that is common to transaction instrument data 201, a second transaction instrument, and/or at least one record associated with a second transaction instrument. In another example, the customer is identified by information that is common to transaction instrument data 201, a second transaction instrument, and/or at least one record associated with a second transaction instrument and/or transaction account. In an example, the second transaction instrument associated with the customer is identified by authorization system 206 by searching at least one customer record 216A, 216B, 218, and 220 in database of customer information 208. In an embodiment, step 306 is performed by merchant system 204 and/or a merchant.

In step 308, data element 202 is compared with at least one record 216A, 216B, 218, and 220 associated with the second transaction instrument to create a comparison result that verifies an address. In an example, step 308 is performed on data element 202 and at least one customer record 216A, 216B, 218, and 220 contained in database of customer information 208 by authorization system 206. In an embodiment, step 308 is performed by merchant system 204 and/or a merchant. In one example of step 308, customer record 216A, 216B, 218, and 220 associated with the second transaction instrument contains data representing at least one of a name, a phone number, an address, a postal code, an e-mail address, an IP address, a complete social security number, a partial social security number, an account number, a customer code, a personal identification number, and/or a customer-specific alphanumeric identifier.

The comparison result of step 308 may then be provided to merchant system 204 and/or a merchant. The comparison result may, for example, be an identifier such as match, partial match, or no match. The comparison result may also identify customer record 216A, 216B, 218, and 220 upon which the comparison result is based. The comparison result may also identify whether the comparison result is, or is not, based on customer record 216A, 216B, 218, and 220 associated with transaction instrument data 201 received in step 302. In an example, the comparison result identifies data element 202 that does and/or does not match customer records 216A, 216B, 218, and 220 in database of customer information 208. In another example, the comparison result provides an alphanumeric response indicating a level of correlation between data element 202 and customer records 216A, 216B, 218, and 220.

Transaction risk may be calculated based in part on the comparison result. For example, the transaction risk calculation may be performed based in part on the comparison result by a data verification system, authorization system 206, merchant system 204, and/or a merchant.

An authorization result may be decided based in part on the comparison result. For example, the authorization result may be determined by a verification system, authorization system 206, merchant system 204, and/or a merchant. In an example, an authorization result is provided to a merchant by authorization system 206 and/or merchant system 204. In another example, an authorization result is provided to merchant system 204 by authorization system 206 and/or a merchant. In an example, the provision of authorization results and/or comparison results is communicated via communication link 212.

Figure 4A:
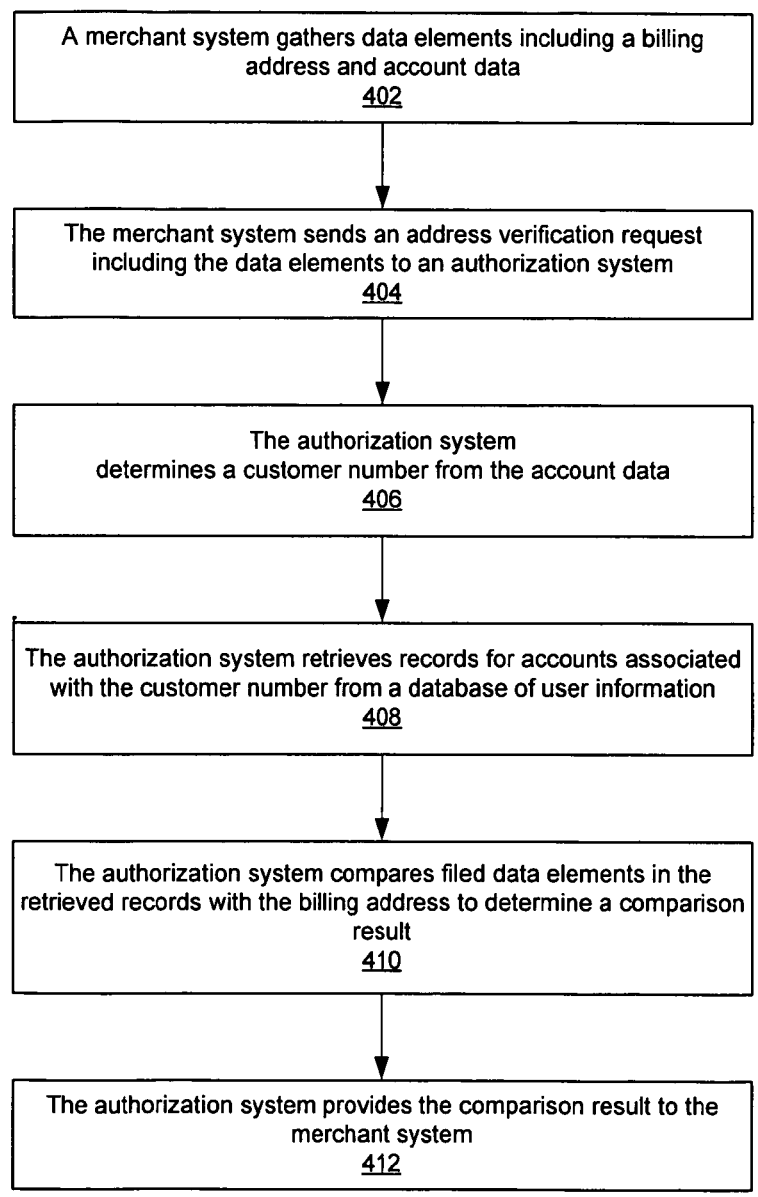
FIG. 4A is another flowchart of an exemplary process for customer-level address verification.
Figure 4B:
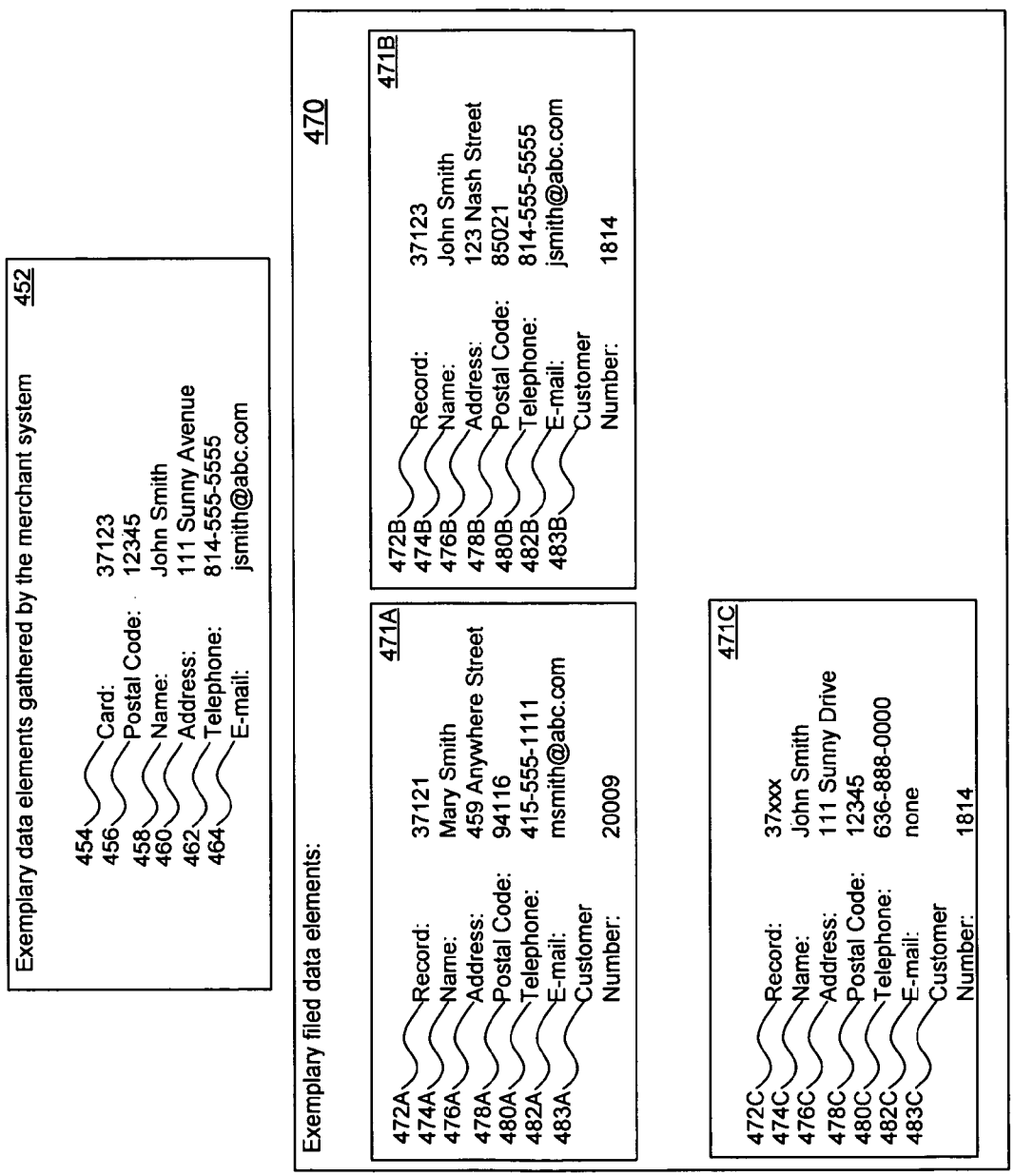
FIG. 4B is a block diagram of an exemplary process for customer-level address verification showing received data elements and filed data elements.

FIG. 4A is a flowchart of an exemplary process 400 for customer-level address verification. FIG. 4B shows example received data elements 452 and example filed data elements and/or records 470 used in process 400. In an embodiment, process 400 is performed by the system illustrated in FIG. 2 and/or FIG. 7.

In step 402, a merchant system gathers data elements including a billing address and account data. In an example, received data elements 452 that are gathered by the merchant system include a postal code 456, a name 458, an address 460, a telephone number 462, and/or an e-mail address 464. The account data includes a financial transaction instrument number 454.

In step 404, the merchant system sends an address verification request including the data elements to an authorization system. In an example, the authorization system receives received data elements 452 with financial transaction instrument number 454 from the merchant system.

In step 406, the authorization system determines a customer number from the account data. In an example, the authorization system searches filed data elements and/or records 470. Filed data elements and/or records 470 may be part of customer records 471A, 471B, and 471C in a database of customer information. Record 471A is an exemplary customer record and includes a record number 472A, a name 474A, an address 476A, a postal code 478A, a telephone number 480A, an e-mail address 482A, and a customer number 483A. Example records 471B and 471C include similar types of information. Information contained in a filed data element and/or record 470 may be in any format and may contain alphanumeric characters. In an example, the record number is a transaction account number. In another example, the record number is financial transaction instrument number 454. The address may be a physical location at which a customer receives correspondence. The authorization system retrieves the customer's first record 471B that is associated with financial transaction instrument number 454 in received data elements 452. The authorization system then retrieves customer number 483B that is part of the customer's first record 471B.

In step 408, the authorization system searches for, and retrieves, account records associated with the customer number. In an example, the authorization system compares the retrieved customer number 483B with other customer numbers in the filed data elements and/or records 470. In the example shown in FIG. 4B, customer record 471C contains customer number 483C identical to customer number 483B of the customer's first record 471B. Record 471C may be associated with a different financial transaction instrument than record 471B.

In step 410, the authorization system compares filed data elements in the retrieved records with the billing address to determine a comparison result. In an example, at least one of the filed data elements of the customer's second record 471C is compared to received data elements 452. For example, the filed data element of postal code 478C is compared to the received data element of postal code 456. The comparison yields a comparison result. In an example, the comparison result is match, partial match, or no match.

In step 412, the authorization system communicates the comparison result to the merchant system. In an example, the comparison result of match, partial match, or no match is provided to the merchant system and/or the merchant for each comparison of gathered data elements as well as the over-all comparison result for all received data elements. For example, results provided to a merchant system are a comparison result for postal code of match, a comparison result for addresses of a partial match, a comparison result for name of match, a comparison result for e-mail of match, and an over-all comparison result of partial match. The authorization request results may be provided to a merchant point of sale device, website, and/or merchant sales system. The merchant system and/or merchant may use the comparison results as input to a decision-making process.

Figure 5A:
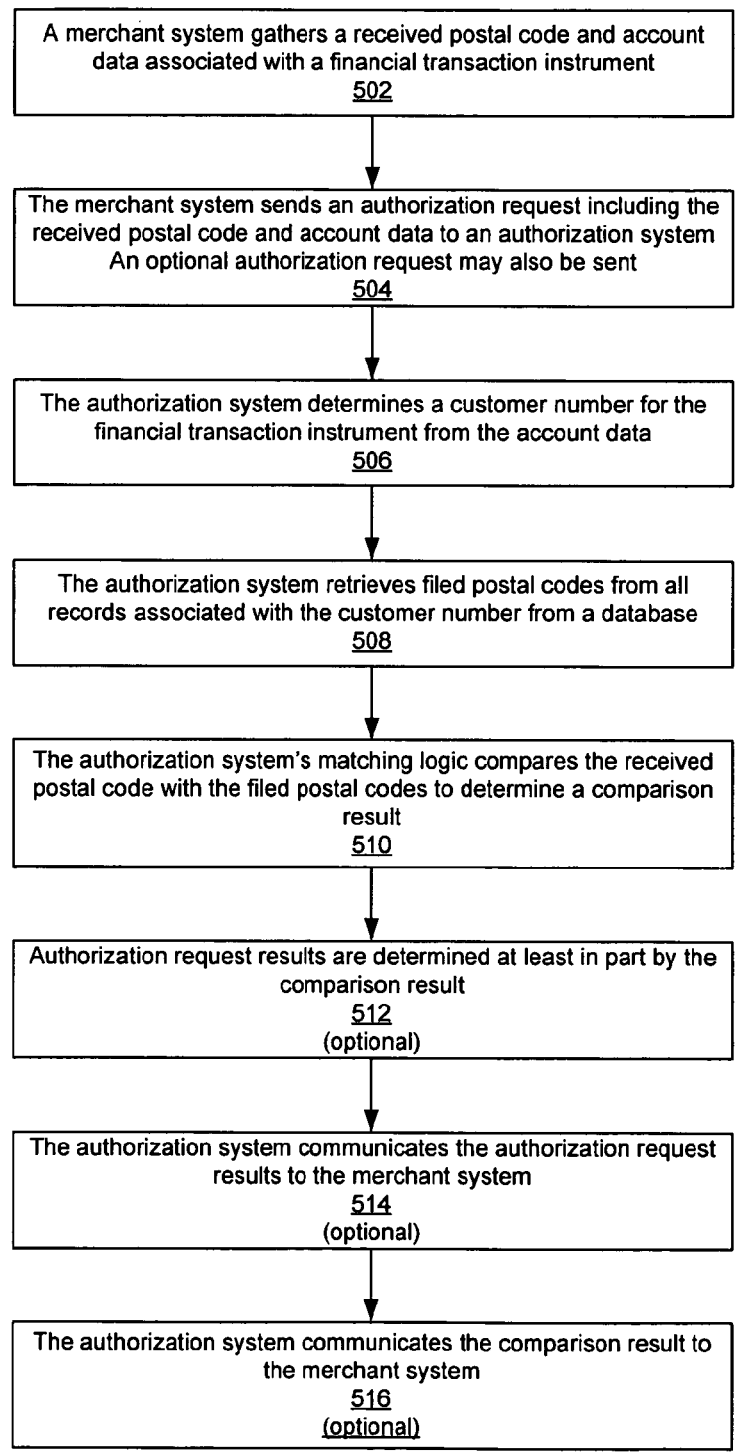
FIG. 5A is a flowchart of an exemplary process for customer-level address verification where a financial transaction instrument is presented.
Figure 5B:
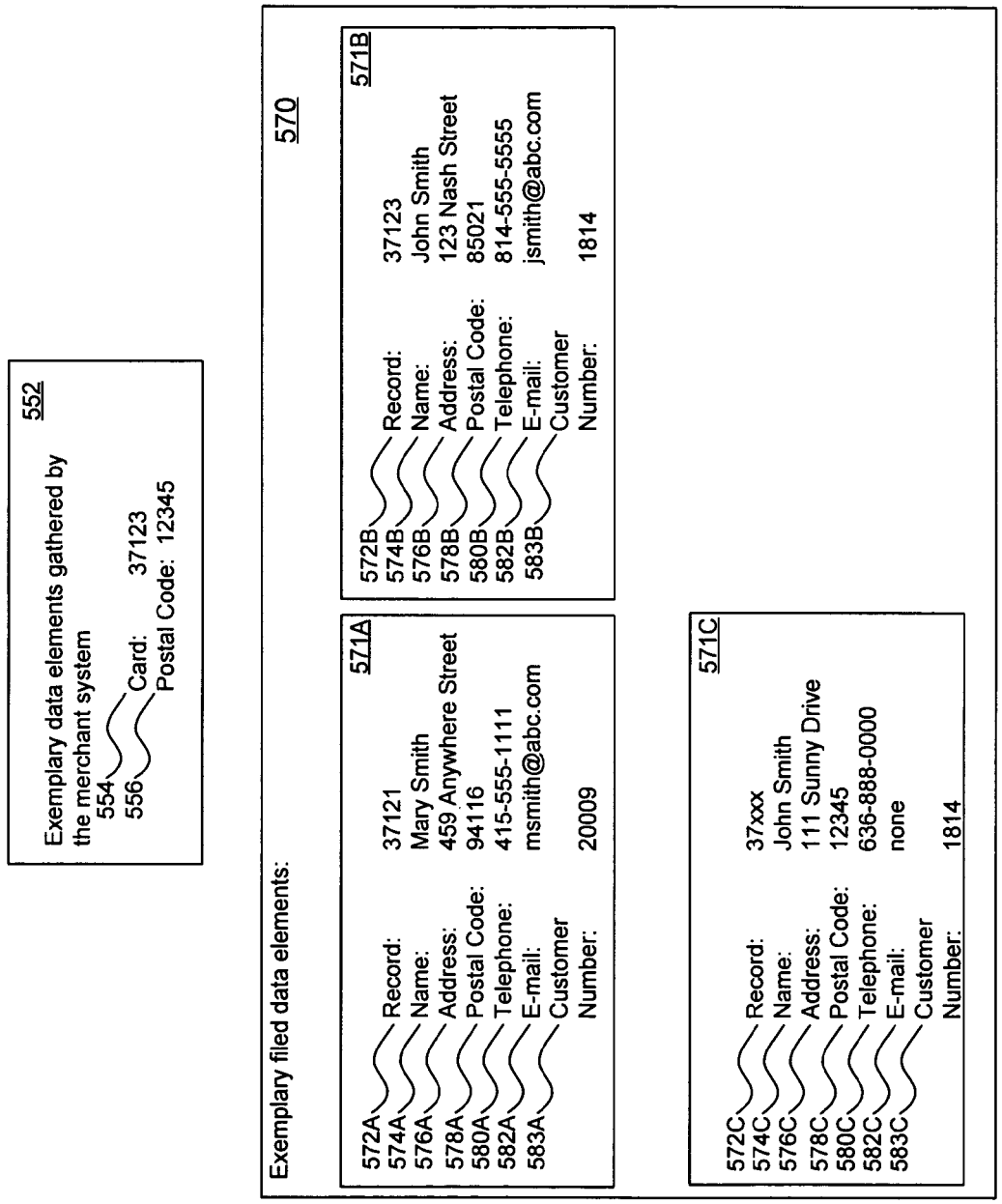
FIG. 5B is a block diagram of an exemplary process for customer-level address verification showing received data elements and filed data elements where a financial transaction instrument is presented.

FIG. 5A is a flowchart of an exemplary process 500 for customer-level address verification where a financial transaction card is presented by a customer to a merchant. FIG. 5B shows example received data elements 552 and example filed data elements 570 used in process 500. In an embodiment, process 500 is performed by the system shown in FIG. 2 and/or FIG. 7.

In step 502, a merchant system gathers a received postal code and account data associated with a financial transaction instrument. In an example, received data elements 552 that are gathered by the merchant system include a postal code 556. The account data includes financial transaction instrument number 554.

In step 504, the merchant system sends a data verification request including the received postal code and account data, to an authorization system. An optional authorization request may also be sent. In an example, the authorization system receives data elements 552.

In step 506, the authorization system determines a customer number for the financial transaction instrument from the account data. In an example, the authorization system searches filed data elements and/or records 570. In an example, filed data elements and/or records 570 are part of customer records 571A, 571B, and 571C. Record 571A is an exemplary customer record, and includes a record number 572A, a name 574A, an address 576A, a postal code 578A, a telephone number 580A, an e-mail address 582A, and a customer number 583A. Example records 571B and 571C include similar types of information. In an example, the record number is a transaction account number. In another example, the record number is financial transaction instrument number 554. The authorization system retrieves the customer's first record 571B that is associated with financial transaction instrument number 554 in received data elements 552. The authorization system then retrieves customer number 583B that is part of customer's first record 571B.

In step 508, the authorization system retrieves, from a database, filed postal codes from all records associated with the customer number. The authorization system may compare retrieved customer number 583B with other customer numbers in filed data elements and/or records 570. In the example shown in FIG. 5B, second record 571C contains customer number 583C that is identical to customer number 583B of the customer's first record 571B. The second record may be associated with a different financial transaction instrument than the first record. Filed postal code 578C of the customer's second record 571C is retrieved for comparison with received data elements 552.

In step 510, the authorization system's matching logic compares the received postal code with the filed postal codes to determine a comparison result. In an example, filed postal code 578C of the customer's second record 571C is compared to received postal code 556. The comparison yields a comparison result. In an example, the comparison result is match, partial match, or no match.

In step 512, authorization request results are determined at least in part by the comparison result. This step is optional. In an example, the authorization request results in performance of risk analysis. An authorization request may yield an outcome of approved, pended, referred, or declined. The authorization result may be determined by a merchant, merchant system, or authorization system.

In step 514, the authorization system communicates the authorization request results to the merchant system. This step is optional. In an example, the authorization result of approved, pended, referred, or declined is provided to the merchant system and/or the merchant. The authorization request results may be provided to a merchant point of sale device, website, and/or merchant sales system.

In step 516, the authorization system communicates the comparison result to the merchant system. This step is optional. The comparison result may be for comparison of a single data element or for comparison of multiple data elements. In an example, the comparison result of match, partial match, and/or no match is provided to the merchant system and/or the merchant for each comparison of gathered data elements as well as the overall comparison result for all gathered data elements. For example, results provided to a merchant system are a comparison result for postal codes of match, a comparison result for address of a partial match, a comparison result for name of match, a comparison result for e-mail of match, and an over-all comparison result of partial match. The comparison results may be provided to a merchant point of sale device, website, and/or merchant sales system. The merchant system and/or merchant may use the comparison results as input to a decision-making process.

Figure 6A:
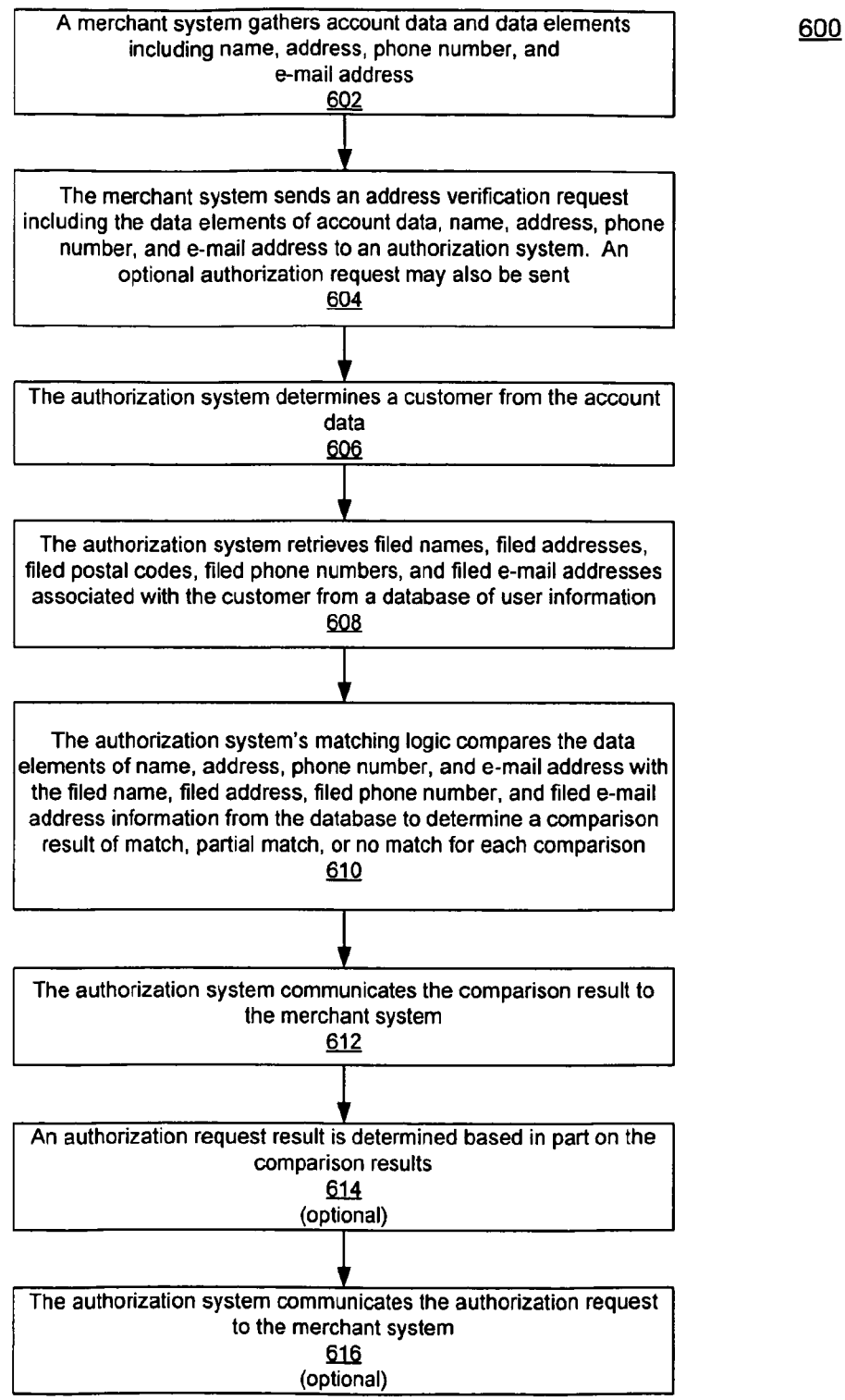
FIG. 6A is a flowchart of an exemplary process for customer-level address verification where a financial transaction instrument is not presented by a customer to a merchant.
Figure 6B:
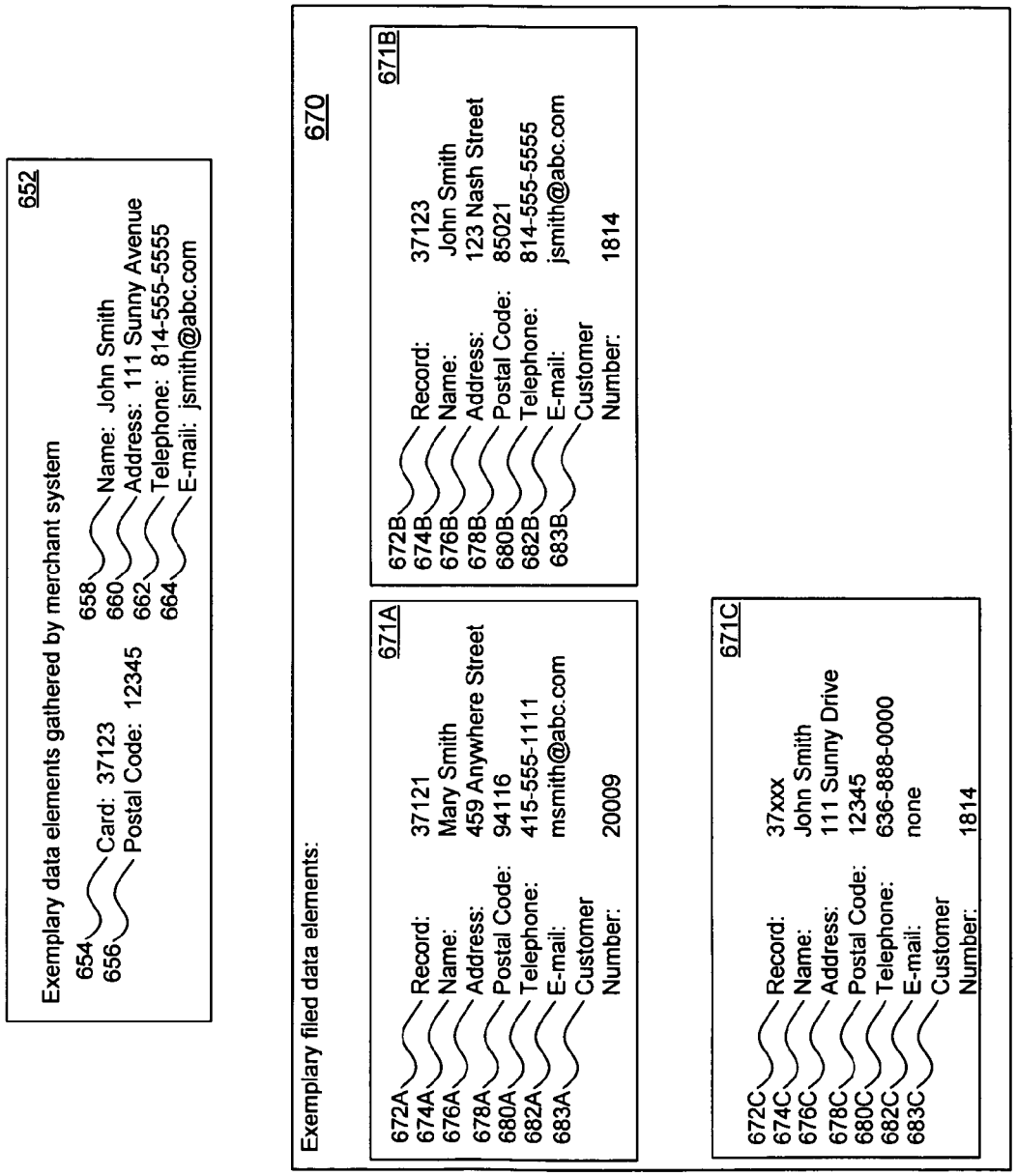
FIG. 6B is a block diagram of an exemplary process for customer-level address verification showing received data elements and filed data elements where a financial transaction instrument is not presented.

FIG. 6A is a flowchart of an exemplary process 600 for customer-level address verification where a financial transaction instrument is not presented by a customer to a merchant, but instead, an account number or information from a financial transaction instrument is provided. This type of transaction takes place when a customer telephonically or electronically communicates with a merchant, for example, by purchasing a product via the internet and/or over a telephone. FIG. 6B shows example received data elements 652 and example filed data elements 670 used in process 600. In an embodiment, process 600 is performed by the system shown in FIG. 2 and/or FIG. 7.

In step 602, a merchant system gathers account data and data elements including name, address, phone number, and/or e-mail address. In an example, received data elements 652 that are gathered include a postal code 656, a name 658, an address 660, a telephone number 662, and/or an e-mail address 664. The account data includes a financial transaction instrument number 654.

In step 604, the merchant system sends, to an authorization system, an address verification request including the data elements of account data, name, address, phone number, and/or e-mail address. An optional authorization request may also be sent. In an example, the authorization system receives received data elements 652.

In step 606, the authorization system determines a customer from the account data. In an example, the authorization system searches filed data elements and/or records 670. Filed data elements and/or records 670 may be part of customer records 671A,B, and C. Record 671A is an exemplary customer record, and includes a record number 672A, a name 674A, an address 676A, a postal code 678A, a telephone number 680A, an e-mail address 682A, and a customer number 683A. Example records 671B and 671C include similar types of information. Record number 672A may be a transaction account number and/or a financial transaction instrument number. The authorization system retrieves first record 671B that is associated with financial transaction instrument number 654 in received data elements 652. The authorization system then retrieves customer number 683B that is part of first record 671B.

In step 608, the authorization system retrieves filed names, filed addresses, filed postal codes, filed phone numbers, and/or filed e-mail addresses associated with the customer from a database of customer information. In an example, the authorization system compares retrieved customer number 683B with other customer numbers in filed data elements and/or records 670. In the example shown in FIG. 6B, there is a second record 671C that contains the customer number 683C identical to customer number 683B of first record 671B. The second record may be associated with a different financial transaction instrument or a different transaction account than the first record. Filed name 674C, address 676C, postal code 678C, phone number 680C, and/or e-mail address 682C of second record 671C may be retrieved for comparison.

In step 610, the authorization system's matching logic compares the data elements of name, address, phone number, and e-mail address with filed name, filed address, filed phone number, and/or filed e-mail address information from the database of customer information to determine a comparison result. In an example, filed data elements of second record 671C are compared to received data elements 652. For example, filed data element of postal code 678C is compared to the received data element of postal code 656. The comparison yields a comparison result for each individual comparison as well as an over-all comparison result for the collection of comparisons. In an example, the comparison result is match, partial match, or no match.

In step 612, the authorization system communicates the comparison result to the merchant system. In an example, the comparison result of match, partial match, and/or no match is provided to the merchant system and/or the merchant for each comparison of gathered data elements as well as the over-all comparison result for all gathered data elements. For example, results provided to a merchant system are a comparison result for postal codes of match, a comparison result for address of a partial match, a comparison result for name of match, a comparison result for e-mail of match, and an over-all comparison result of partial match. The authorization request results may be provided to a merchant point of sale device, website, and/or merchant sales system. The merchant system and/or merchant may use the comparison results as input to a decision-making process.

In step 614, an authorization result is determined based in part on the comparison results. This step is optional. In an example, the authorization request results in performance of risk analysis. An authorization request may yield an outcome of approved, pended, referred, or declined. The authorization result may be determined by a merchant, merchant system, and/or authorization system.

In step 616, the authorization system communicates the authorization results to the merchant system. This step is optional. In an example, the authorization result of approved, pended, referred, or declined is provided to the merchant system and/or the merchant. The authorization request results may be provided to a merchant point of sale device, website, and/or merchant sales system.

IV. Example Implementations

The methods and/or processes herein (i.e., the system and/or process listed above or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers and/or similar devices.

Figure 7:
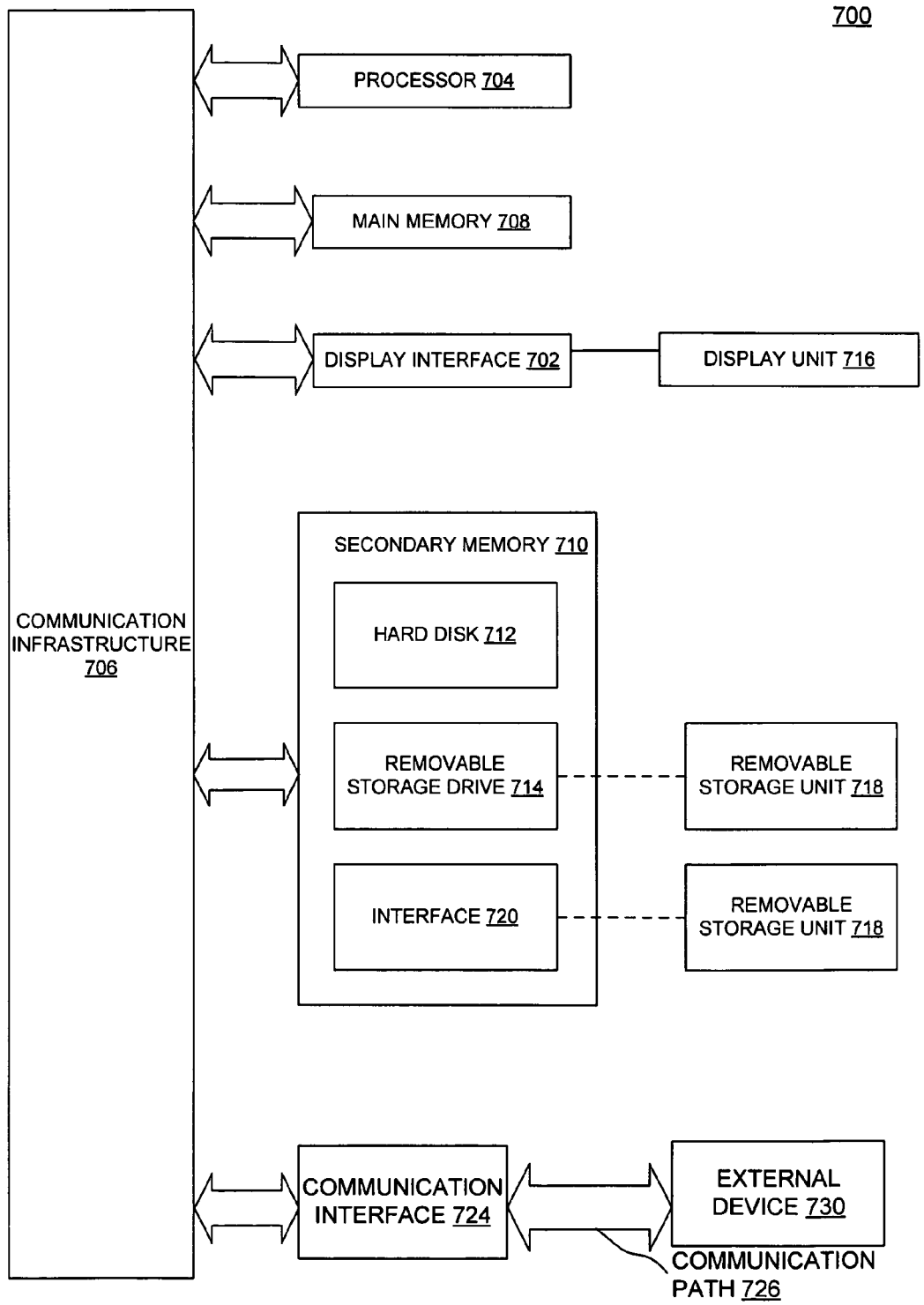
FIG. 7 is a block diagram of an exemplary computer system useful for implementing the present invention.

In one embodiment, the invention is directed toward one or more computer systems capable of carrying out the functionality described herein. An example of a computer system 700 is shown in FIG. 7.

Computer system 700 includes one or more processors 704. Processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 700 can include a display interface 702 that forwards graphics, text, and other data from communication infrastructure 706 (or from a frame buffer not shown) for display on display unit 716.

Computer system 700 also includes a main memory 708, preferably random access memory (RAM), and may also include a secondary memory 710. Secondary memory 710 may include, for example, a hard disk drive 712 and/or a removable storage drive 714, representing a floppy disk drive, a magnetic tape drive, an optical disk drive, an information storage device, etc. Removable storage drive 714 reads from and/or writes to a removable storage unit 718. Removable storage unit 718 represents a floppy disk, a magnetic tape, an optical disk, etc. which is read by, and written to, by removable storage drive 714. Removable storage unit 718 includes a computer usable storage medium having stored therein computer software and/or data.

In alternative embodiments, secondary memory 710 may include other similar devices for allowing computer programs or other instructions to be loaded into computer system 700. Such devices may include, for example, removable storage unit 718 and an interface 720. Examples of secondary memory 710 include a program cartridge and cartridge interface, a removable memory chip (such as an erasable programmable read only memory (EPROM), and/or programmable read only memory (PROM)) with an associated socket, and removable storage unit 718 and/or interface 720, which allow software and data to be transferred from removable storage unit 718 to computer system 700.

Computer system 700 may also include a communications interface 724. Communications interface 724 allows software and data to be transferred between computer system 700 and an external device 730. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals which may be electronic, electromagnetic, optical or other signals capable of being received by communications interface 724. These signals are provided to communications interface 724 via a communications path (e.g., channel) 726. Communications path 726 carries signals and may be implemented using wire or cable, fiber optics, a telephone line, a cellular link, a radio frequency (RF) link, and/or other communications channels.

In this document, the terms "computer program medium" and "computer usable medium" are used to generally refer to media such as removable storage drive 714, a hard disk installed in hard disk drive 712, and signals. These computer program products provide software to computer system 700. The invention is directed to such computer program products.

Computer programs (also referred to as computer control logic) are stored in main memory 708 and/or secondary memory 710. Computer programs may also be received via communications interface 724. Such computer programs, when executed, enable computer system 700 to perform the features of the present invention, as discussed herein. In particular, the computer programs, when executed, enable processor 704 to perform the features of the present invention. Accordingly, such computer programs represent controllers of computer system 700.

In an embodiment where the invention is implemented using software, the software may be stored in a computer program product and loaded into computer system 700 using removable storage drive 714, hard drive 712 or communications interface 724. The control logic (software), when executed by processor 704, causes processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract and Summary sections are not intended to limit the scope of the present invention in any way.

What is claimed is:

1. A method for authorizing a transaction by a user of a financial transaction instrument, the method comprising:
    receiving, by a computer system, an authorization request from a merchant system for a transaction that has been initiated using the financial transaction instrument, wherein the authorization request includes billing data for the user of the financial transaction instrument;
    retrieving, by the computer system and from an authorization database, a plurality of records, including by:
        retrieving a first record from the authorization database based on an account number associated with the financial transaction instrument; and
        based on information included in the first record, retrieving one or more additional records from the authorization database; and
    comparing, by the computer system, portions of the billing data with corresponding portions of the plurality of records;
    based on the comparing, the computer system producing a comparison result indicative of a partial match in which a first portion of the billing data is found in a particular one of the plurality of records and a second portion of the billing data is not found in the particular record but is found in another one of the plurality of records;
    calculating, by the computer system, a transaction risk based on the comparison result;
    based on the transaction risk, the computer system determining whether to authorize the transaction; and
    communicating, by the computer system to the merchant system, a result indicating whether the transaction was authorized.

2. The method of claim 1, further comprising:
    based on the billing data, the computer system determining that the transaction is a card-not-present transaction.

3. The method of claim 1, further comprising:
    generating, by the computer system, an alphanumeric code based on the comparison result, wherein the alphanumeric code is indicative of a correlation between the billing data and the plurality of records.

4. The method of claim 1, wherein the information included in the first record is a customer number that identifies the user.

5. The method of claim 1, wherein the first portion of the billing data is a street address and the second portion of the billing data is a postal code.

6. The method of claim 1, wherein the determining whether to authorize the transaction further comprises:
    the computer system authorizing the transaction based on the transaction risk being lower than a threshold.

7. The method of claim 1, wherein the merchant system corresponds to at least one of: a point-of-sale device, a sales platform, or a website.

8. An article of manufacture including a non-transitory computer readable medium having instructions stored thereon that are executable by a computing device to cause the computing device to perform operations comprising:
    receiving, from a merchant system, a transaction request indicating that a user has initiated a transaction with the merchant system using a financial transaction instrument, wherein the transaction request includes billing data;
    retrieving a plurality of records associated with the user from an authorization database, including by:
        retrieving a first record from the authorization database based on an account number associated with the financial transaction instrument; and
        based on information included in the first record, retrieving one or more additional records from the authorization database; and
    comparing portions of the billing data with corresponding portions of the plurality of records;

calculating a transaction risk based on the comparing indicating that a first portion of the billing data is found in a particular one of the plurality of records and a second portion of the billing data is not found in the particular record but is found in another one of the plurality of records;

determining whether to authorize the transaction based on the transaction risk; and communicating, to the merchant system, a result for the transaction request indicating whether the transaction was authorized.

9. The article of manufacture of claim 8, wherein the operations further comprise:

based on the information included in the first record, identifying a customer number that corresponds to the user, wherein customer number corresponds to the additional records.

10. The article of manufacture of claim 8, wherein the comparing further comprises:

comparing an e-mail address included in the billing data with e-mail addresses included in the plurality of records, wherein the first portion of the billing data is the e-mail address.

11. The article of manufacture of claim 8, wherein the operations further comprise:

in response to receiving the transaction request, determining that the transaction is a card-not-present transaction.

12. A system comprising:

a processor; and a non-transitory memory having instructions stored thereon that are executable by the processor to cause the system to perform operations comprising:

receiving an authorization request from a merchant system for a transaction that has been initiated using a financial transaction instrument, wherein the authorization request includes billing data for a user of the financial transaction instrument;

retrieving, from an authorization database, a plurality of records, including by:

retrieving a first record from the authorization database based on an account number associated with the financial transaction instrument; and based on information included in the first record, retrieving one or more additional records from the authorization database; and comparing portions of the billing data with corresponding portions of the plurality of records;

based on a comparison result of the comparing that is indicative of a partial match in which a first portion of the billing data is found in a particular one of the plurality of records and a second portion of the billing data is not found in the particular record but is found in another one of the plurality of records, calculating a fraud risk;

determining whether to authorize the transaction based on the fraud risk; and communicating a result to the merchant system that indicates whether the transaction was authorized.

13. The system of claim 12, wherein in comparing, the operations further comprise:

comparing an address included in the billing data with addresses included in the plurality of records, wherein the address is a shipping address that is different from an address included in the particular record, wherein the address is the second portion of the billing data.

14. The system of claim 12, wherein the operations further comprise:

declining the transaction based on determining that the fraud risk for the transaction exceeds a threshold.

15. The system of claim 12, wherein the operations further comprise:

based on the billing data, determining an identifier that is associated with the financial transaction instrument, wherein the additional records correspond to the identifier.

16. The system of claim 12, wherein the operations further comprise:

upon comparing the billing data and the plurality of records, determining a code indicative of a correlation between the billing data and the plurality of records.

* * * * *